Sept. 26, 1933.  E. W. SEEGER  1,928,138
MOTOR CONTROLLER
Filed Feb. 28, 1930
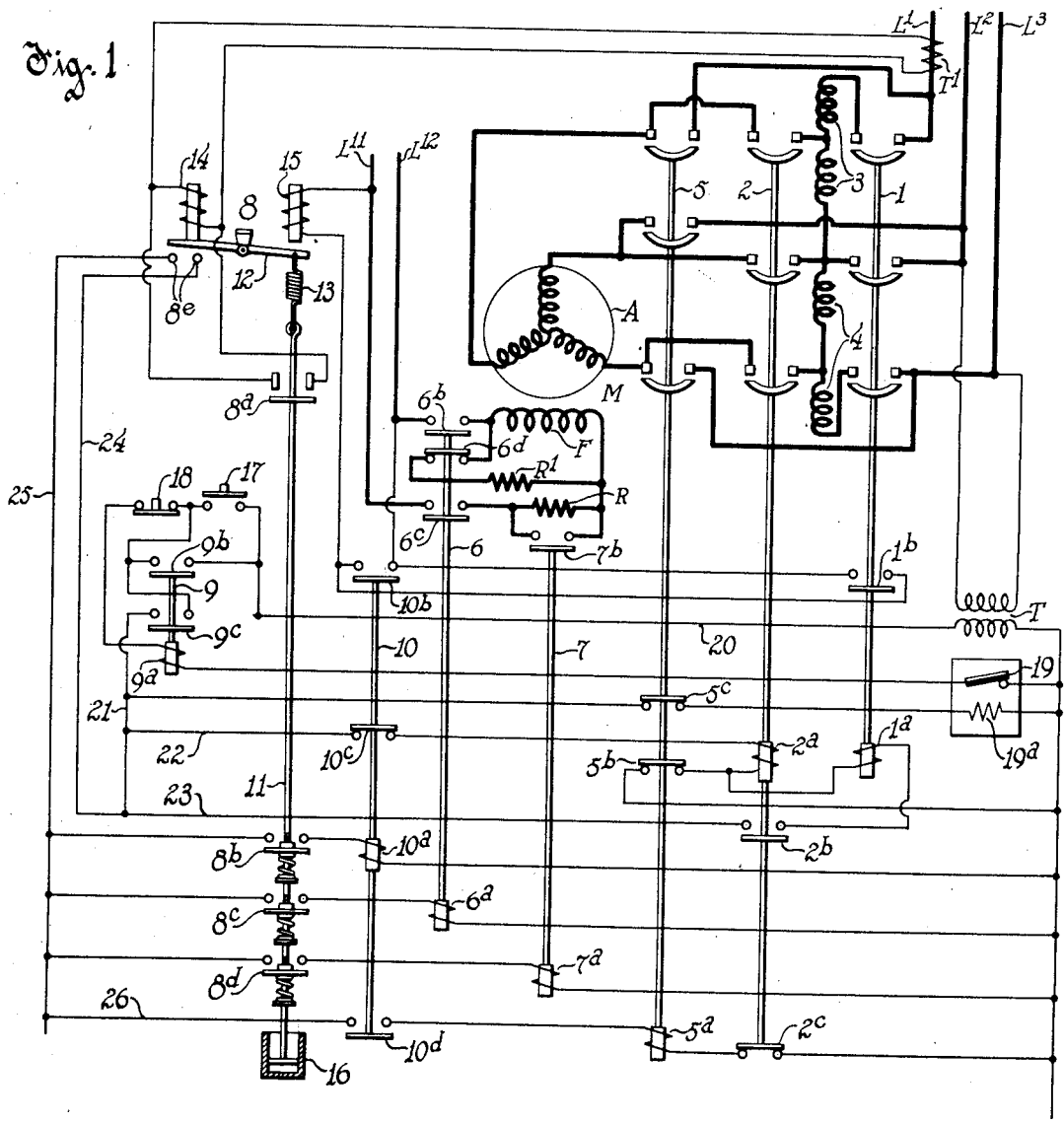

Patented Sept. 26, 1933

1,928,138

UNITED STATES PATENT OFFICE 1,928,138

MOTOR CONTROLLER

Edwin W. Seeger, Wauwatosa, Wis., assignor to Cutler-Hammer, Inc., Milwaukee, Wis., a corporation of Delaware Application February 28, 1930. Serial No. 431,997

5 Claims. (Cl. 172—289)

This invention relates to motor controllers and while not limited thereto is particularly applicable to controllers for synchronous motors.

The invention has among its objects to provide an improved automatic controller for starting synchronous motors and bringing the same up to synchronous speed in an efficient and reliable manner.

Another object is to provide an automatic starting controller for synchronous motors, having improved control means for timing interruption of starting connections and establishment of running connections.

Another object is to provide a controller of the aforesaid character wherein the timing means is operable only upon given current conditions in the motor circuit and then only after a given period of delay to interrupt starting connections and establish running connections.

Various other objects and advantages of the invention will hereinafter appear.

The accompanying drawing illustrates certain embodiments of the invention which will now be described, it being understood that the embodiments illustrated may be modified in certain respects without departing from the spirit and scope of the appended claims.

In the drawing,

Figure 1 diagrammatically illustrates one form of controller embodying the invention, and Fig. 2 diagrammatically illustrates a modified form of controller embodying the invention.

Referring to Fig. 1, the same illustrates a synchronous motor M having an armature A to be supplied with current from a three phase alternating current circuit indicated by lines $L^1$, $L^2$ and $L^3$ and a field winding F to be supplied with current from a direct current circuit indicated by lines $L^{11}$ and $L^{12}$.

The controller for motor M includes a pair of three pole electromagnetic starting switches 1 and 2 for connecting the armature A to lines $L^1$, $L^2$, $L^3$ through the medium of low voltage taps on compensator windings 3 and 4, a three pole electromagnetic running switch 5 for connecting said armature directly to lines $L^1$, $L^2$, $L^3$ and electromagnetic field control switches 6 and 7. Switch 6 has normally open contacts $6^b$ and $6^c$ for connecting the field winding F to lines $L^{11}$ and $L^{12}$ through the medium of a resistance R and normally closed contacts $6^d$ for connecting a resistance $R^1$ across the terminals of field F. Switch 7 is provided with normally open contacts $7^b$ for shunting resistance R. Each of the aforementioned switches is provided with an operating winding designated by reference character $a$ and as hereinafter set forth said operating windings are controlled by relays 8, 9 and 10 and are adapted to be energized by current from a transformer T connected across lines $L^2$ and $L^3$.

Relay 8 is provided with a movable contact carrying member 11 which is connected to a pivoted operating member 12 through the medium of a spring 13. Said operating member has a restraining winding 14 and an operating winding 15 arranged on opposite sides of the pivot thereof, the restraining winding being supplied with current from a series transformer $T^1$ and being adapted upon given current conditions in the armature circuit of the motor to hold said operating member in normal position against the action of said operating winding. The operating winding 15 is supplied with current from lines $L^{11}$ and $L^{12}$ and is controlled as hereinafter set forth by relay 10 and by auxiliary contacts $1^b$ associated with starting switch 1. Upon response of operating member 12 under the action of winding 15, spring 13 is placed under tension to effect upward movement of the contact carrying member 11, such movement being retarded by a dash pot 16. Member 11 is provided with normally open contacts $8^a$ for shunting restraining winding 14 and normally open contacts $8^b$, $8^c$ and $8^d$ for controlling the operating windings of relay 10 and field switches 6 and 7, respectively, through the medium of normally open contacts $8^e$ associated with operating member 12. Contacts $8^b$, $8^c$ and $8^d$ are each slidably mounted upon the contact carrying member 11, and as shown each has a spring associated therewith for holding the same in engagement with a stop on said member. For purposes hereinafter set forth the stops associated with contacts $8^b$, $8^c$ and $8^d$ are adjustable on member 11 to provide for closure of said contacts in a predetermined timed relation.

Relay 9 is provided with an operating winding $9^a$ and normally open contacts $9^b$ and $9^c$. The energizing circuit for said winding is controlled by a normally open start push button 17, a normally closed stop push button 18 and a normally closed electrothermal relay 19. Relay 19 is of a conventional type, the same being responsive to an electric heater $19^a$ which is controlled by relay 9 through the medium of auxiliary contacts $5^c$ associated with running switch 5. As hereinafter set forth relay 9 is adapted to maintain itself in closed position through the medium of stop push button 18 and relay 19, and the same provides for energization of starting switch 2 through the medium of relay 10 and normally closed auxiliary contacts 5$^b$ associated with running switch 5, and for energization of starting switch 1 through the medium of said auxiliary contacts 5$^b$ and normally open auxiliary contacts 2$^b$ associated with starting switch 2.

Relay 10 is provided with an operating winding 10$^a$, normally open contacts 10$^b$ for controlling the operating winding 15 of relay 8, normally closed contacts 10$^c$ for controlling starting switch 2 and normally open contacts 10$^d$ for controlling running switch 5 through the medium of normally closed auxiliary contacts 2$^c$ associated with starting switch 2.

The function and operation of the aforedescribed controller and also the circuit connections therefor will now be more fully described. Depression of push button 17 establishes an energizing circuit for relay 9 extending from the left hand terminal of transformer T, by conductor 20 through push buttons 17 and 18, to and through the operating winding 9$^a$ of said relay and thence through the normally closed electrothermal relay 19 to the right hand terminal of transformer T. Upon closure of relay 9 the auxiliary contacts 9$^b$ thereof shunt the start push button 17, to maintain the aforedescribed energizing circuit and starting switch 2 is then energized by a circuit extending from the left hand terminal of transformer T, by conductor 20, through contacts 9$^b$ and 9$^c$, by conductors 21 and 22, through contacts 10$^c$ of relay 10, through the operating winding 2$^a$ of said starting switch and through auxiliary contacts 5$^b$ of running switch 5 to the right hand terminal of transformer T. Upon closure of starting switch 2 an energizing circuit for starting switch 1 is established extending from the left hand terminal of transformer T, through relay 9, to conductor 21 as already traced, by conductor 23, through auxiliary contacts 2$^b$ of starting switch 2, through the operating winding 1$^a$ of said starting switch, through auxiliary contacts 5$^b$ associated with running switch 5 to the right hand terminal of transformer T.

As is apparent from Fig. 1, upon closure of starting switches 1 and 2 compensator windings 3 and 4 are connected between lines L$^1$—L$^2$ and L$^2$—L$^3$, respectively, while two of the terminals of the armature A are connected to low voltage taps on said compensator windings, the other terminal of said armature being connected to line L$^2$. The motor then starts as an induction motor, the field winding F thereof being connected in shunt across resistance R$^1$ by contacts 6$^d$ of field switch 6.

Upon establishment of starting connections for the motor, operating winding 15 of relay 8 is connected across lines L$^{11}$—L$^{12}$ by auxiliary contacts 1$^b$ of starting switch 1, and restraining winding 14 is supplied with current by transformer T$^1$ to hold operating member 12 in normal position against the action of winding 15. As the motor accelerates the current in the motor circuit decreases and upon a given decrease in the current in such circuit winding 15 overcomes the restraining action of winding 14 to effect response of operating member 12. Member 12 in responding places spring 13 under tension and contact carrying member 11 then moves upwardly against the retarding action of dash pot 16. Upon initial upward movement of member 11 contacts 8$^a$ close to shunt restraining winding 14 and upon continued upward movement of said member contacts 8$^b$, 8$^c$ and 8$^d$ close in the order named and in a predetermined timed relation with respect to each other. Closure of contacts 8$^b$ energizes relay 10 by a circuit extending from the left hand terminal of transformer T, by conductor 20, through contacts 9$^b$ and 9$^c$ of relay 9, by conductors 21 and 24, through contacts 8$^e$ of relay 8, by conductor 25, through contacts 8$^b$ and through the operating winding 10$^a$ of relay 10 to the right hand terminal of transformer T. Upon response of relay 10 the contacts 10$^c$ thereof interrupt the aforedescribed energizing circuit for starting switch 2 and said starting switch in dropping out interrupts the aforedescribed energizing circuit for starting switch 1. Upon opening of starting switch 1 winding 15 is maintained energized by contacts 10$^b$ of relay 10, and upon opening of starting switch 2 running switch 5 is energized by a circuit extending from the left hand terminal of transformer T through relay 9 to conductor 25, as already traced, by conductor 26, through contacts 10$^d$ of relay 10, through the operating winding 5$^a$ of running switch 5 and through auxiliary contacts 2$^c$ of starting switch 2 to the right hand terminal of transformer T. Closure of running switch 5 connects the motor armature A directly to lines L$^1$, L$^2$, L$^3$.

Following closure of contacts 8$^b$ of relay 8, the contacts 8$^c$ close to establish an energizing circuit for field switch 6 extending from the left hand terminal of transformer T through relay 9, to conductor 25, as already traced, through contacts 8$^c$ and through the operating winding 6$^a$ of said field switch to the right hand terminal of transformer T. As is apparent, upon response of field switch 6 the field winding F is connected across lines L$^{11}$—L$^{12}$ through the medium of resistance R by contacts 6$^b$ and 6$^c$, and resistance R$^1$ is disconnected from the field winding by contacts 6$^d$.

Following closure of contacts 8$^c$ of relay 8 the contacts 8$^d$ thereof close to establish an energizing circuit for field switch 7, extending from the left hand terminal of transformer T through relay 9, to conductor 25, as already traced, through contacts 8$^d$ and the operating winding 7$^a$ of said field switch to the right hand terminal of transformer T. Field switch 7 in responding excludes resistance R from the field circuit of the motor.

In connection with the foregoing it should be noted that since relay 8 is operative only upon given current conditions in the motor circuit the duration of the starting period is influenced by the load on the motor. The restraining winding 14 of relay 8 is designed to permit response of said relay while the motor is operating below synchronous speed, and as is apparent the time element means associated with said relay is then adapted to interrupt the starting connections for the motor and establish the running connections therefor at the proper instant, or in other words, when the motor is brought up to substantially synchronous speed. As is apparent, the time element means associated with relay 8 can be adjusted to suit the conditions under which the motor operates or to adapt the controller to motors of different designs. For example, contacts 8$^b$ and 8$^c$ can be adjusted to first effect closure of running switch 5 and to thereafter effect closure of field switch 6, as hereinbefore described, or said contacts can be adjusted to effect closure of said switches in a reversed sequence.

As hereinbefore set forth, relay 9 controls the energizing circuits of starting switches 1 and 2 and the energizing circuit for said relay extends through electrothermal relay 19. Relay 19 is responsive under the action of its heater coil 19ᵃ to interrupt the energizing circuit of relay 9 unless running connections for the motor are established within a given interval. As is apparent from Fig. 1, upon closure of relay 9 the heater coil 19ᵃ of relay 19 is energized by a circuit extending from the left hand terminal of transformer T through relay 9, to conductor 21, as already traced, through contacts 5ᶜ of running switch 5 and thence through said heater coil to the right hand terminal of transformer T. Upon response of running switch 5 contacts 5ᶜ open to interrupt the energizing circuit for heater coil 19ᵃ. The motor can be stopped at any time by depressing the stop push button 17 to interrupt the aforedescribed energizing circuit for relay 9.

Referring now to Fig. 2, the same illustrates a so-called across-the-line starter embodying the invention. As shown in Fig. 2, the armature A of motor M is adapted to be connected directly to lines L¹, L², L³ by a 3-pole electroresponsive line switch 30, while the field winding F of said motor is controlled by an electroresponsive switch 31. Switch 30 is controlled by a normally open electroresponsive relay 32 and the energizing circuit for said relay is controlled by a normally open starting push button 33, a normally closed stop push button 34, and auxiliary contacts 30ᵇ associated with line switch 30. Field switch 31 is provided with normally closed contacts 31ᵇ for connecting the field winding F across a resistance R³ and normally open contacts 31ᶜ for connecting said field winding across lines L¹¹—L¹², and the energizing circuit for said switch is controlled by a timing relay 35. Relay 35 is provided with a contact member 36 which is pivoted intermediate its ends and cooperates with stationary contacts 37. Contact member 36 is connected to line switch 30 by a spring 38 and upon closure of said line switch said spring is placed under tension and is adapted to move said contact member into engagement with contacts 37 against the action of a dash pot 39. A restraining winding 40 is associated with contact member 36, said winding being adapted to hold said contact member in open position and being connected to a series transformer T³ which is included in the armature circuit of the motor.

As is apparent from Fig. 2, upon closure of push button 33 the operating winding 32ᵃ of relay 32 is connected across lines L¹¹—L¹² through the medium of push button 34 and said relay in responding connects the operating winding 30ᵃ of line switch 30 across lines L²—L³. Line switch 30 in responding connects the armature A directly to lines L¹, L², L³ and upon closure of said line switch relay 32 is maintained energized through the medium of auxiliary contacts 30ᵇ and stop push button 34. Also upon closure of main switch 30 spring 38 is placed under tension and tends to effect closure of the contact member 36. However, upon closure of line switch 30 restraining winding 40 is energized by transformer T³ to hold contact member 36 in normal position against the action of spring 38. When the current in the armature circuit of the motor drops to a given value spring 38 overcomes the restraining action of winding 40 and contact member 36 then moves into engagement with contacts 37 against the action of dash pot 39. Upon movement of contact member 36 into closed position the operating winding 31ᵃ of field switch 31 is connected across lines L²—L³ and said field switch in responding connects the field winding F across lines L¹¹—L¹² and disconnects resistance R³ from the field circuit of the motor.

Thus it is apparent that the timing relay 35 illustrated in Fig. 2 functions in substantially the same manner as the timing relay 8 shown in Fig. 1 to time interruption of starting connections and establishment of running connections for the motor.

What I claim as new and desire to secure by Letters Patent is:

1. The combination with a synchronous motor, of electroresponsive switches for selectively establishing starting and running connections for said motor, a time element device associated with said switches for timing interruption of starting connections and establishment of running connections, a spring associated with said device for operating the same upon establishment of starting connections and a restraining winding associated with said device for rendering the same inoperative under the action of said spring upon given current conditions in the motor circuit.

2. The combination with a synchronous motor, of switches for selectively establishing reduced voltage armature connections for starting and full voltage armature connections for running, a switch for connecting the field winding of said motor to a direct current source, and control means for the aforesaid switches including a time element relay for timing the operation of said switches, said relay having spring means associated therewith for operating the same upon establishment of starting connections and having a restraining winding associated therewith for preventing operation thereof upon given current conditions in the armature circuit of said motor.

3. The combination with a synchronous motor, of separate electroresponsive switches for selectively establishing reduced voltage armature connections for starting and full voltage armature connections for running, an electroresponsive switch for controlling the field winding of said motor, and control means for the aforesaid switches including a time element relay having a plurality of contacts for timing the operation of said switches, said relay having spring means associated therewith for operating the same upon establishment of starting connections and having a restraining winding associated therewith for preventing operation thereof upon given current conditions in the armature circuit of said motor, the contacts of said relay being adjustable to vary the sequence of closure of said field control switch and said running switch.

4. The combination with a synchronous motor, of a switch for controlling power connections for the armature winding of said motor, an electroresponsive switch adapted to normally establish starting connections for the field winding of said motor and responsive to establish running connections therefor, a time element device operative to time energization of said latter switch, means including a spring for operating said device upon closure of said first mentioned switch and means for delaying operation of said device by said spring and for rendering said device operative only upon given electrical conditions in the motor circuit.

5. The combination with a synchronous motor, of separate electroresponsive switches for selectively establishing reduced voltage armature connections for starting and full voltage armature connections for running, an electroresponsive switch for controlling the field winding of said motor, and control means for the aforesaid switches including a time element relay having a plurality of contacts for timing the operation of said switches, said relay being adapted to operate upon establishment of starting connections and having a restraining winding associated therewith for preventing operation thereof upon given current conditions in the armature circuit of said motor, the contacts of said relay being adjustable to vary the sequence of closure of said field switch and said running switch.

EDWIN W. SEEGER.